US009838532B2

(12) United States Patent
Minert et al.

(10) Patent No.: US 9,838,532 B2
(45) Date of Patent: Dec. 5, 2017

(54) CONTACT CENTER LOAD FORECASTING (71) Applicant: inContact, Inc., Midvale, UT (US)

(72) Inventors: Brian Douglas Minert, Orem, UT (US); Derek DeHart, Columbus, OH (US)

(73) Assignee: INCONTACT, INC., Salt Lake City, UT (US)

(*) Notice: Subject to any disclaimer, the term of this patent is extended or adjusted under 35 U.S.C. 154(b) by 80 days.

(21) Appl. No.: 14/958,696

(22) Filed: Dec. 3, 2015

(65) Prior Publication Data

US 2017/0163798 A1 Jun. 8, 2017

(51) Int. Cl.
*H04M 5/00* (2006.01)
*H04M 3/36* (2006.01)
*G06Q 30/02* (2012.01)
*H04M 3/523* (2006.01)

(52) U.S. Cl.
CPC .......... *H04M 3/36* (2013.01); *G06Q 30/0205* (2013.01); *H04M 3/5238* (2013.01); *H04M 2203/555* (2013.01); *H04M 2242/30* (2013.01)

(58) Field of Classification Search
CPC ...................................................... H04M 3/36
USPC ....... 379/266.01–266.1, 265.01–265.14, 309
See application file for complete search history.

(56) References Cited

U.S. PATENT DOCUMENTS

| | | | | |
|---|---|---|---|---|
| 8,224,685 B2* | 7/2012 | Sekine | ................... | G06Q 30/02 705/7.29 |
| 9,105,035 B2* | 8/2015 | Kozine | ................... | H04L 67/22 |
| 2008/0147498 A1* | 6/2008 | Chao | ...................... | G06Q 30/02 705/14.41 |
| 2009/0257624 A1* | 10/2009 | Ikumi | .................... | G06Q 30/02 382/113 |
| 2009/0319340 A1* | 12/2009 | Sekine | ................... | G06Q 30/02 705/7.29 |
| 2012/0330716 A1* | 12/2012 | Volpe | ................. | G06Q 30/0201 705/7.29 |
| 2016/0307215 A1* | 10/2016 | Kogoshi | ............ | G06Q 30/0201 |

* cited by examiner

*Primary Examiner* — William Deane, Jr.
(74) *Attorney, Agent, or Firm* — Pearl Cohen Zedek Latzer Baratz LLP (57) ABSTRACT

An example method of generating contact totals based on customer communication patterns in different time zones may include obtaining information indicative of geographic locations for customers of a contact center. The obtained information may be analyzed to determine locations for the customers based on the information indicative of geographic locations. The time zone behaviors for each of the determined locations of the customers may be determined. The method may include accumulating numbers of the customers contacting the contact center for a sampled time period. Contact totals may be generated based on the accumulated numbers. The accumulated numbers may be stored along with the corresponding time zone behaviors for the determined locations of the customers.

10 Claims, 5 Drawing Sheets

|  | Reference Time | | | | |
|---|---|---|---|---|---|
| Location | 10:00 | 11:00 | 12:00 | 13:00 | 14:00 |
| Utah | 100 | 120 | 150 | 120 | 100 |
| Arizona | 50 | 60 | 70 | 60 | 50 |
| Totals | 150 | 180 | 220 | 180 | 150 |

*FIG. 5A*

|  | Reference Time | | | | |
|---|---|---|---|---|---|
| Location | 10:00 | 11:00 | 12:00 | 13:00 | 14:00 |
| Utah | 100 | 120 | 150 | 120 | 100 |
| Arizona | 40 | 50 | 60 | 70 | 60 |
| Totals | 140 | 170 | 210 | 190 | 160 |

*FIG. 5B*

CONTACT CENTER LOAD FORECASTING

BACKGROUND

Daylight saving time (DST) refers to the practice of annually altering timekeeping rules such that daylight may be experienced relatively later in the day for a portion or portions of the year. Jurisdictions that employ DST generally alter a Coordinated Universal Time (UTC) offset observed by the jurisdiction for a length of time each year. Observing DST may generally be associated with two DST events. A first DST event, which may occur during the spring season, generally includes collectively adjusting clocks forward by an hour. A second DST event, which may occur during the fall season, generally includes collectively adjusting clocks backward by an hour. For example, the U.S. state of New York may ordinarily observe time at 5 hours behind UTC (UTC-5), described as Eastern Standard Time (EST), and may observe time at 4 hours behind UTC (UTC-4) while DST is in effect, described as Eastern Daylight Time (EDT).

Many, but not all countries employ DST. Furthermore, some countries, such as the U.S., may include jurisdictions that employ DST as well as jurisdictions that do not employ DST. By way of example, contrary to the other states of the United States, the states of Arizona and Hawaii currently do not generally observe DST.

Contact centers may generally engage in electronic communication with customers. The nature of electronic communication may enable the contact centers to serve customers over extended geographical areas. Contact centers capable of serving extended geographical areas may thus serve both jurisdictions that employ DST and jurisdictions that do not employ DST.

SUMMARY

An example method of generating contact totals based on customer behavior in different time zones may include obtaining information indicative of geographic locations for customers of a contact center. The obtained information may be analyzed to determine locations for the customers based on the information indicative of geographic locations. The time zone behaviors for each of the determined locations of the customers may be determined. The method may include accumulating numbers of the customers contacting the contact center for a sampled time period. Contact totals may be generated based on the accumulated numbers. The accumulated numbers may be stored along with the corresponding time zone behaviors for the determined locations of the customers.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

BRIEF DESCRIPTION OF THE DRAWINGS

Example embodiments will be described and explained with additional specificity and detail through the use of the accompanying drawings in which.

DETAILED DESCRIPTION

The subject matter disclosed may generally relate to load forecasting and workforce management for contact centers. Contact centers capable of serving an extended geographical area may encounter challenges in accounting for the effects of Daylight Saving Time (DST) events occurring across the geographical area. For example, conventional contact centers, or call centers, may employ workforce management (WFM) forecasting systems that may, conventionally, exhibit limitations in their ability to account for DST events. Furthermore, conventional WFM forecasting systems may be limited in their ability to account for changes in how, when, and/or where DST is employed. For example, support for adopting, changing, and/or abolishing the DST system may be growing in some jurisdictions of the U.S. and other countries. Should jurisdictions adopt, change, and/or abolish the DST system, conventional WFM forecasting systems may be limited in their ability to account for such changes.

Generally, WFM may include activities directed to maintaining a productive workforce. In a contact center context, WFM may be implemented to schedule agents and other members of the workforce to staff the contact center. One goal of WFM may be to efficiently schedule a suitably sized workforce to handle contact loads of the contact center. A contact may generally include an interaction between a customer and the contact center. The contact may include the electronic communications between the customer and an agent or systems of the contact center. The electronic communications may include telephone communication, email, instant messages, social media communication, co-browsing, short message service (SMS) messages, multimedia message service (MMS) messages, and the like or any combination thereof. The contact load may be associated with a unit of time, such as a number of contacts per minute, per quarter hour, per hour, or the like. A number of factors may vary the contact load, such as a time of day, a day of the week, holidays, special events, and the like or any combination thereof. By way of example, the contact load may be described as a traffic pattern, such as a contact center having 450 contacts per hour from 8:00-9:00 pm on a Friday night.

Forecasting may be employed by WFM to predict future contact loads. Load prediction algorithms of the WFM forecasting may employ historical load data, scheduled events, forecasted conditions such as weather forecasts, and the like or any combination thereof. As indicated above, current WFM systems often exhibit limitations in their ability to handle DST events and/or changes in execution of DST by one or more jurisdictions in load forecasting algorithms. Thus, for example, WFM systems may underperform in contact load prediction because of such limitations.

Underperformance of contact load prediction in WFM systems may be costly for a contact center. For example, if a contact load is projected to be larger than is actually experienced by the contact center, an excessive workforce may be scheduled, which may result in an underutilized workforce. Alternatively, if a contact load is projected to be larger than is actually experienced by the contact center, then an insufficient workforce may be scheduled, which may result in relatively long wait times for customers to communicate with an agent of the contact center. Thus, for example, underperformance of the contact load prediction in WFM systems may result in a decrease in workforce morale, in missing quality of service benchmarks, in missing contractual service level agreements that may result in monetary penalties for the contact center, in a decrease in customer goodwill for the contact center and/or an associated company, or the like. Furthermore, underperformance of WFM systems may lead to an inefficient use of non-workforce resources, such as office space, computer processing power and/or storage, and energy such as electricity consumed by the contact center. Some embodiments may improve the ability of a WFM forecasting system to account for DST events and/or changes in DST observance and may result in improved contact load predictions and improved efficiency in the use of the contact center workforce and resources.

In some circumstances, the rate at which customers contact the contact center may change during certain time frames throughout the day. For example, relatively more customers may contact the contact center during hours of the day corresponding to customers' lunch breaks, often observed at approximately the same time each day.

"Time zone behavior" may refer to the time zone, DST implementation, reference time standard and/or UTC offset of a jurisdiction, location, and/or geographic area. Categorization of locale according to time zone behavior may be used to improve the outcome of load prediction algorithms. In some circumstances, improved historical data analyzation methods may increase the effectiveness of load prediction analysis and WFM. Furthermore, the effectiveness of load prediction analysis and WFM may be improved by accounting for impending DST transitions. For example, a demand for workforce resources may be more effectively predicted for DST implementations that have not been observed previously.

Figure 1:
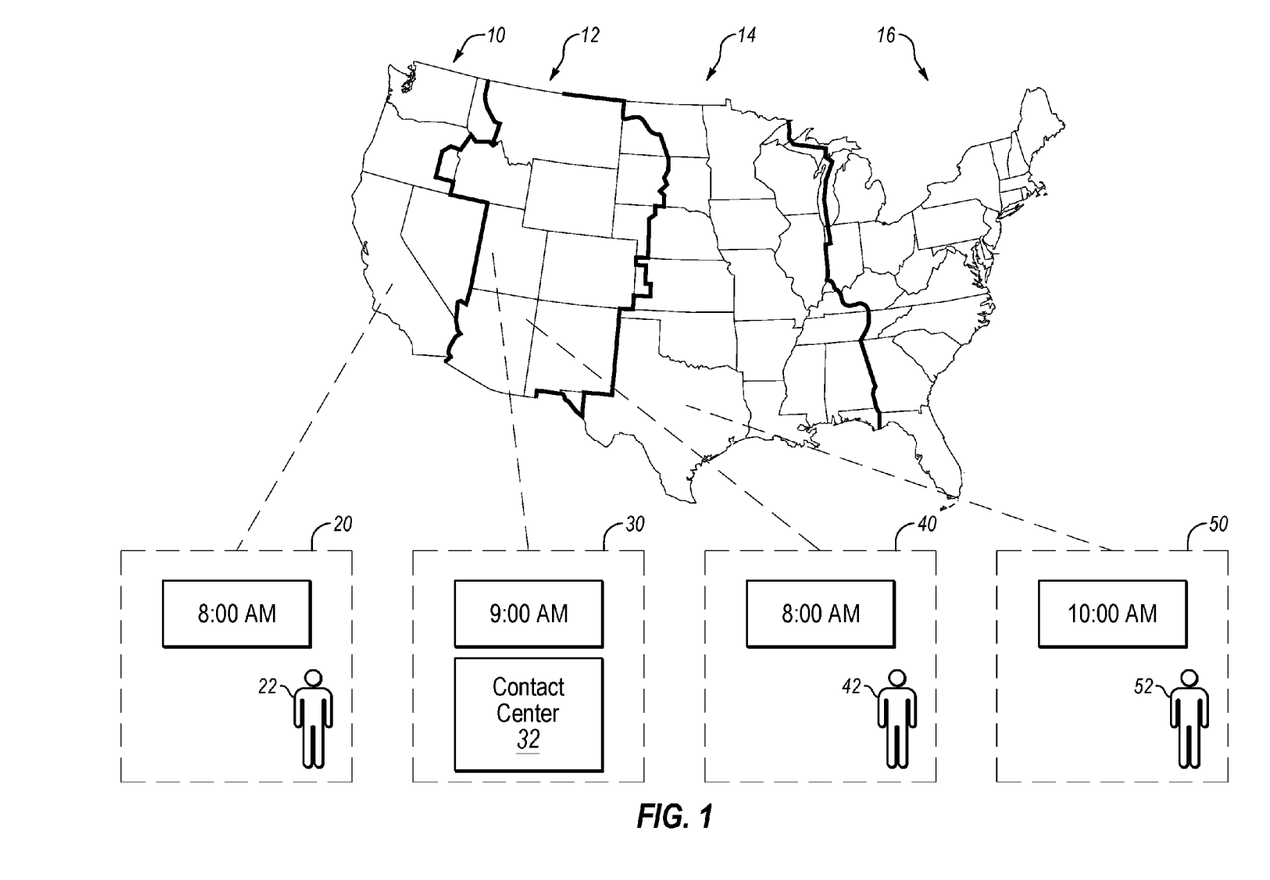
FIG. 1 is a diagram of an example operating environment of a contact center.

FIG. 1 is a diagram of an example operating environment of a contact center 32. The contact center 32 may manage contacts of the contact center and/or may perform WFM. The contact center 32 may include a premise-based contact center and/or so-described cloud-hosted solutions, such as Internet-based resources, and/or other network-based resources. In some embodiments, the contact center 32 may include multiple sites located in multiple locations. The sites may be geographically dispersed. For example, different sites of the contact center 32 may be located in different time zones, in different countries, and/or on different continents. Alternately or additionally, agents and/or other members of the contact center 32 workforce may be located at a location other than a contact center site. For example, agents and/or other members of the contact center workforce may perform their work duties from their homes.

The contact center 32 may generally contract with one or more tenants (or patrons) to provide contact center services for the one or more tenants. The tenants may generally include business entities that have contracted with the contact center 32 for customer support, sales, and/or other contact center services from the contact center 32. A contact center 32 dedicated to providing services for a single tenant may be described as having a single tenant configuration. A contact center 32 configured to provide services for multiple tenants may be described as having a multi-tenant configuration.

The contact center 32 may be configured to communicate with customers located in different geographic locations and time zones. For example, a geographic area may include time zone 10, time zone 12, time zone 14, and time zone 16. A customer 22 at a first location 20 may be located in the time zone 10. The contact center 32 may be located at a second location 30 in the time zone 12. A customer 42 at a third location 40 may be located in the same time zone 12 as the contact center 32. A customer 52 at a fourth location 50 may be located in the time zone 14.

As illustrated, when the time at the location 30 of the contact center 32 is 9:00 am, the time at the location 20 is 8:00 am, and the time at the location 50 is 10:00 am. Although the location 40 is in the same time zone 12 as the location 30 of the contact center 32, the time at the location 40 is 8:00 am rather than 9:00 am, because location 30 is in a jurisdiction that observes DST, and location 40 is in a jurisdiction that does not observe DST. Accordingly, in the illustrated example, the location 20, location 30 and location 50 are observing DST and location 40 is not observing DST.

When DST ends, for example, at some time during the fall season, the time observed at the location 20, location 30 and location 50 will shift by one hour. The time of day will be the same at the location 30 of the contact center 32 and the location 40 of the customer 42. The time of day at the location 20 will be one hour less than the time at the location 30 of the contact center 32, and the time of day at the location 50 will be one hour greater than the time at the location 30 of the contact center 32.

In some circumstances, the location 30 of the contact center 32 may be selected as the reference location. However, in other circumstances any location or time standard may be selected as the reference location or reference time standard.

Although the geographic area illustrated in FIG. 1 corresponds with a country, specifically the United States, the contact center 32 may be located in and/or may communicate with customers located anywhere in the world, and is not limited to any geographic area or country. Furthermore, customers may be located in any number of time zones and/or jurisdictions with different time zone behaviors. In some circumstances, time zone jurisdictions may be separated based on geographic divisions such as states, cities, counties, or other relevant divisions. In other circumstances, time zone jurisdictions may be determined in any manner by a governing authority. In yet other circumstances, time zone jurisdictions may be changed. Although this description employs a 12-hour time convention, the described concepts may be applied to 24-hour time conventions, or any other suitable time conventions.

Figure 2:
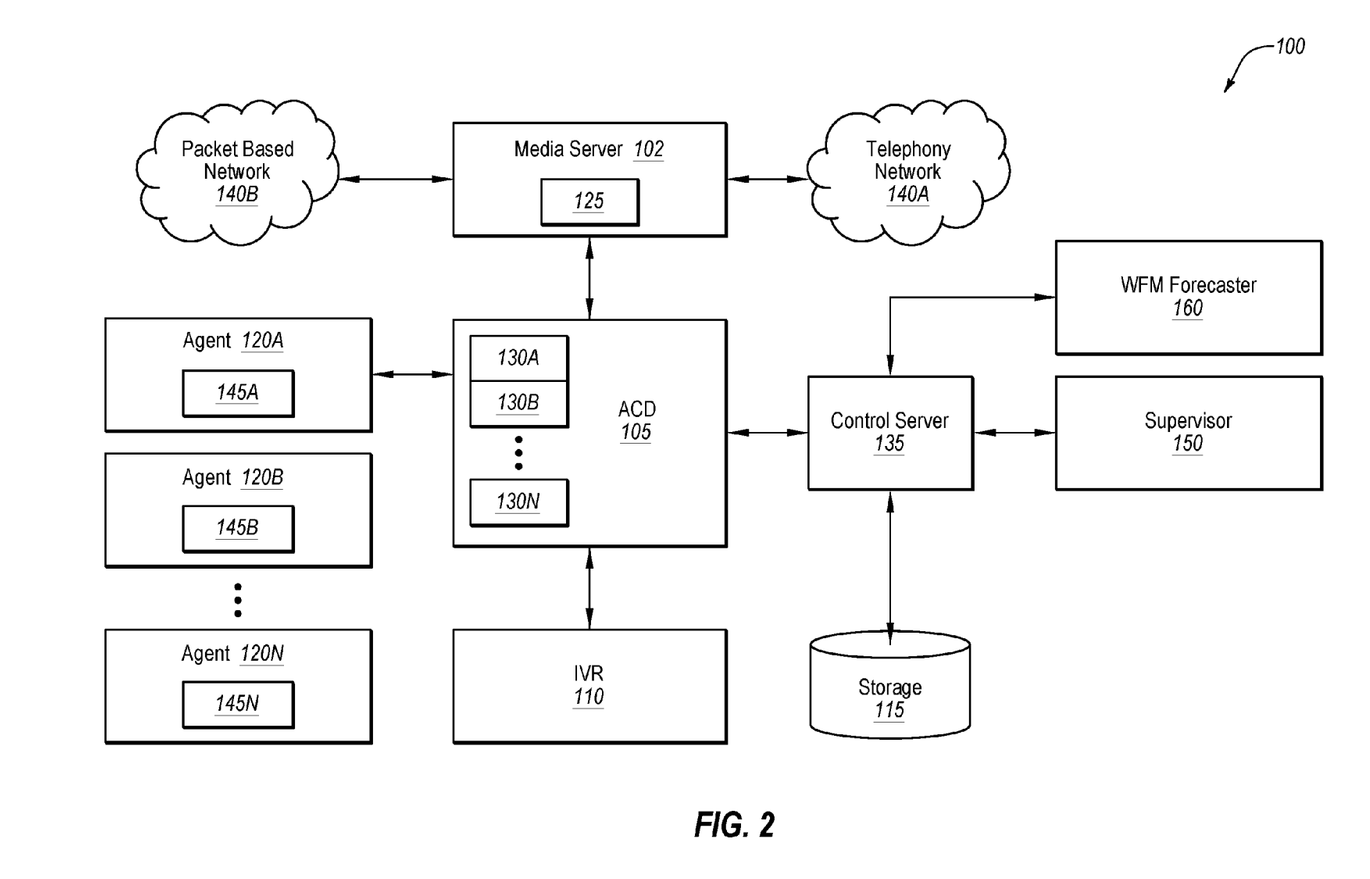
FIG. 2 is a diagram of an example contact center that may be implemented in the operating environment of FIG. 1.

FIG. 2 is a diagram of an example of a contact center 100. The illustrated contact center 100 may be an example configuration of the contact center 32 of FIG. 1, although other configurations may be implemented. The contact center 100 may include media server(s) 102, an automatic contact or call distributor (ACD) 105, an interactive voice response (IVR) 110, storage 115, agent workstations 145A-N (collectively referenced as "145"), and customer networks 140A and 140B (collectively "140"), for example.

The media server 102 may handle the connection paths for media 125 types such as phone calls, SMS messages, MMS messages, instant messages, fax, conferencing, video conferencing, co-browsing, social media channels, video calling, etc. Media recordings may take place in the media server 102. Media servers 102 may include the traditional telephony PBX (Private Branch eXchange), computer servers handling Internet telephony traffic (Voice over Internet Protocol, or VoIP), voice gateways, etc.

The ACD 105 may track the state of each contact 130A-N (collectively "130") and agent 120A-N (collectively "120"), supplying available agents 120 with waiting contacts 130. In some configurations, the ACD 105 may control the routing of media to/from agents 120.

The IVR 110 may be the first stage of handling an incoming call. The process may start by playing pre-recorded audio prompts (e.g. menu selection choices), and accepting handset touch-tone key presses or Automatic Speech Recognition (ASR) to navigate a menu system to supply automated information (such as business address, hours of operation, etc.) or be routed to an agent 120 via the ACD 105.

Storage 115 may include organized computer disk drives as databases and files. Recordings of phone calls, chat sessions and other interactions with customers may be persistently stored on the storage 115 for later reference or review. In some circumstances, activity of the contact center 100 may be recorded and stored in the storage 115. The storage 115 may include data used in the embodiments described herein, including historical load data, contact data, time zone behavior data, and the like or any combination thereof.

The media server 102, the ACD 105, the IVR 110, the storage 115, and the WFM forecaster 160 may be referred to as "back office" equipment, referring to restricted-access supervisor 150 and control computers 135 located in server rooms on premises of the contact center 100 where these types of equipment may be installed and operated. Functional lines between them are often blurred, meaning that there are various solutions which may combine or distribute the functions of these servers and storage. For example, certain IVR functions may be done in media gateways.

Agent workstations 145 may include computers and phones. Agent workstations may also include portable electronics such as laptop computers, netbooks, Internet-capable phones or tablets for contact center agents to interact with customers and media. Software running on these devices may include business applications and programs to interface with the contact center 100, but may extend to programs which may facilitate any suitable aspects disclosed herein. In some embodiments, scheduling of agents, supervisors, and other contact center 100 workforces and/or resources may be based at least in part on load predictions performed by the WFM forecaster 160.

Network connections to traditional telephony network 140A and/or packet-based networks 140B may be used to receive contacts 130 and otherwise interconnect the ACD 105 to other portions of the contact center 100.

In some configurations, the location of the media server 102, the ACD 105 and the storage 115 may be at the physical location of the contact center 100 representing the business. In some circumstances, these "on-premises" solutions may be supplemented, or replaced, by "cloud-based" systems, where the media server 102, the ACD 105 and/or the storage 115 may be operated far from the traditional contact center, and use longer network connections to deliver contact center functionality to the agents 120, be it at home or at more-traditional contact center facilities. In addition, cloud-based solutions may provide a multi-tenant hosting model, where various businesses are delivered contact center functionality via cloud-based equipment which is shared among the businesses, with appropriate safeguards for privacy and data security.

With continued reference to FIG. 2, examples of contacts between customers and the contact center 100 will be described. In one example, the customer may use a traditional "landline" phone to call a company's customer service phone number via the telephony network 140A. The connection paths of the phone may be handled via the media server 102. The customer navigates through a pre-recorded audio menu presented by the IVR 110. The customer inputs responses via touch-tone telephone key presses. The ACD 105 assigns the contact 130A to the agent 120A based on the customer's menu choices and agent availability. Once assigned, the agent 120A may receive the contact at the agent workstation 145A, including information regarding the customer on a screen and the customer's spoken communication relayed to the agent workstation 145A by the media server 102. Spoken communication from the agent 120A is relayed by the media server 102 from the agent workstation 145A to the contact 130.

In another example, the customer uses a computer connected to the Internet to request an instant message chat with a company's customer service via the company's web site over the packet based network 140B. The customer may chat with the agent 120A via the agent workstation 145A. The agent 120A may communicate with the customer via chat while also communicating with other customers via the agent workstation 145A over chat or other media 125 types.

In some circumstances, a customer may communicate with the contact center 100 outside of the normal business hours of the contact center 100. In some configurations, the contact center 100 may respond to customers contacting outside of the normal business hours of the contact center 100. In another example, the customer may use a computer to navigate to a company's website. The website may show a "Click to Talk" link. When selected, the contact center 100 may inform the customer of the regular business hours of the contact center 100 and ask the customer to provide a future time and date when the contact center 100 should initiate communication with the customer.

A customer may enter into a contact with the contact center 100. A contact may include an agent, but an agent is not necessary. A contact may continue as long as some communication remains open between the parties to exchange communication related to a goal of the contact. The contact may end when the customer and the contact center 100 conclude the communication and close or otherwise abandon their channels of communication.

In certain embodiments, when a customer selects a "Click to Talk" link, the contact center 100 causes the customer's browser to render a further menu of options to provide the customer with an option to select a particular function (Sales, Customer Service, etc.) or department, and may even allow a particular phone number or extension to be selected or entered. In some embodiments, the contact center 100 may provide the customer with the option of using a "soft phone" at the customer's computer. In yet other embodiments, the contact center 100 may cause the customer to see an additional browser window containing information deemed by the contact center 100 to be useful to the customer. The information may be in the form of a self-help system, a selection of Frequently-Asked Questions (FAQ), advertising of company products, etc. In certain other embodiments, the browser window may also display a form that invites the customer to enter pertinent details (name, account number, order number, problem description, etc.) that may be used to improve the customer's experience. For example, the details may be provided to an agent should the customer ultimately begin a contact with an agent of the contact center 100. In further embodiments, the forms rendered to the customer's browser may be altered by the contact center 100 based on business logic.

Figure 3:
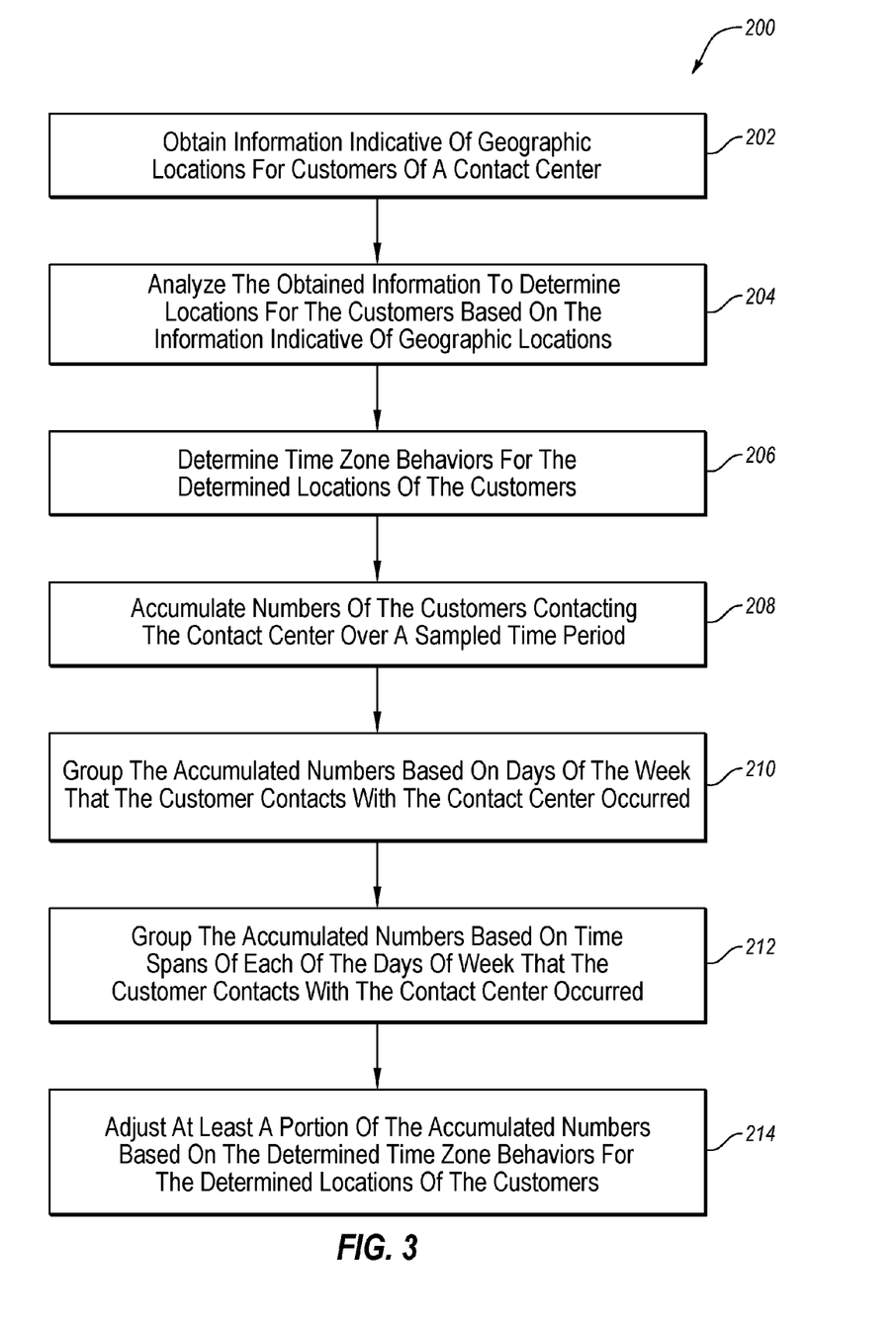
FIG. 3 is a flow diagram of an example method of generating contact totals based on customer behavior in different time zones.

FIG. 3 is a flow diagram of an example method 200 of generating contact totals based on customer behavior in different time zones. In some configurations, the method 200 may be performed by a contact center that generates contact totals based on customer behavior in different time zones. For example, the method 200 may be performed at the WFM forecaster 160 of the contact center 100 of FIG. 2.

The method 200 may begin at block 202. At block 202, information indicative of geographic locations for customers of a contact center may be obtained. The information indicative of geographic locations for customers of a contact center may include an address, a phone number, a GPS location, carrier routing information, an IP address, metadata, social media data of the customer, data associated with the contact media, and the like or any combination thereof. In some configurations, the information indicative of geographic locations for the customers may include contact media or account information for the customers. The information indicative of geographic locations for customers may be obtained from any suitable sources, for example, from contacts with the customers, from databases including information regarding the customers, from public information available via the Internet, and the like or any combination thereof.

In some circumstances, a customer's address may be available. For example, the customer may establish an account or provide their address for shipping purposes. A customer may provide an address prior to a contact or during a contact. In another example, a customer's address may be obtained from a database accessible by the contact center. Alternately or additionally, a customer's address may be obtained from a search of social media and/or the Internet.

In some circumstances, a customer's phone number may be available. Digits from the customer's phone number or Number Plan Area ("NPA" or "NPA/Nxx") may be used to determine an approximate or exact location of the customers.

In some circumstances, a customer's current or previous GPS location may be available. For example, a mobile device such as a smart phone, or other device associated with the customer may be queried for its location. Alternatively or additionally, if a customer attaches a file during a contact, the file may be used to identify a customer's GPS location. Specifically, if a customer attaches a photo file, the photo file may contain the GPS coordinates where the photo was taken.

In some circumstances, carrier routing information indicative of a customer's current or previous location may be available. For example, if a call terminates to a known Local Access and Transport Area (LATA), the time zone and DST compliance of the LATA may be available.

In some circumstances, a customer's IP address may be available. For example, for email, chat, or VoIP contacts, routing or endpoint information may be available. This information may identify the Internet Service Provider (ISP) of the customer and may in some cases include the IP address of the customer. The IP address may be indicative of a customer's location.

At block 204, the obtained information may be analyzed to determine locations for the customers based on the information indicative of geographic locations. The locations of the customers communicating with the contact center may be determined based on any available information, such as: customer address, customer phone number, customer GPS location, carrier routing information, customer IP address, customer metadata, billing address, and/or data associated with the contact media. The determined locations may include information to determine time zone behavior, such as city (which may include additional information to disambiguate, such as state or province and country), telephony system vertical and horizontal coordinates (V&H), GPS coordinates, Latitude & Longitude, and/or ZIP code. The determined locations may be default locations, approximate locations, exact locations and/or a combination thereof.

In some circumstances, other metadata associated with a contact media may provide a basis for customer location approximation, including carrier reconciliation or billing data for the media used for the contact.

In some configurations, Bayesian and/or other statistical analysis may be used to identify an approximate or exact location for a customer. In some aspects, Bayesian analysis may include using any or all available approximation techniques, such as those described above, and performing Bayesian statistical analysis to determine the highest-likelihood location for the customer.

In some configurations, the method 200 may include designating a default location for a customer. For example, a default location may be designated for a customer if an exact or approximate location cannot be determined and/or cannot be determined to a sufficient degree of accuracy. The default location may be, for example, the location of a contact center, or the location of an agent or a subset of agents. In another example, the default location may be the location of a majority of customers of a contact center. In other configurations, the method 200 may include omitting a contact from predictive analysis if an exact or approximate location cannot be determined for a customer.

At block 206, time zone behaviors for the determined locations of the customers may be determined. The time zone behavior may include the time zone of the customer along with the DST behavior of the determined location for the customer. Determining time zone behaviors may include determining a time zone jurisdiction for the determined locations of the customers. The time zone behavior may be determined at the time that each of the customer contacts occurs. In some configurations, the time zone behavior and/or time zone jurisdiction for a customer location may be determined by computation, transformation and/or referencing a table, a database and/or a web service. The time zone behavior may be determined based on the locations determined for the customers based on the information indicative of geographic locations. The time zone behavior may be determined based on city (which may include additional information to disambiguate, such as state or province and country), vertical and horizontal coordinates, GPS coordinates, Latitude & Longitude, and/or ZIP code of the customers. For example, in the United States, the time zone behavior may be identified based in part on the state in which the customer resides or is currently located in. However, in some circumstances and/or for some locations, a portion of the state (such as a city or county) may adhere to a different time zone than the rest of the state (see for example, FIG. 1). In such circumstances, the time zone behavior may take into account such aspects.

At block 208, numbers of the customers contacting the contact center over a sampled time period may be accumulated. In some configurations, the accumulated numbers may represent historical data. The historical data may be selected to represent or predict a future load of a contact center. For example, historical data recorded for a contact center on a previous Wednesday may be used, at least in part, to approximate or predict the load on the contact center for an upcoming Wednesday. Additionally or alternatively, historical data recorded for a contact center on one or more weekdays a year ago may be used, at least in part, to approximate or predict the load on the contact center for an upcoming weekend. In further configurations, historical data may be selected to remove anomalous circumstances, such as holidays. For example, if Christmas Day falls on a Wednesday, the data for that day may be treated as anomalous and not be selected to be used to predict loads on the contact center for an upcoming Wednesday. In some embodiments, the data may be used, at least in part, to predict load on the contact center for an upcoming Christmas Day. The historical data may be selected based on schedules and/or rules that are selected and/or implemented by people or data processing systems.

At block 210, the accumulated numbers may be grouped based on days of the week that the customer contacts with the contact center occurred. For example, contacts occurring on all Mondays over the sampled time period may be grouped together, contacts occurring on all Tuesdays over the sampled time period may be grouped together, and so on. In some circumstances, contacts occurring on weekends may or may not be included in the sampled time period and/or accumulated numbers. In other circumstances, contacts occurring on Saturdays and Sundays may be grouped together, respectively.

At block 212, the accumulated numbers may be grouped based on time spans of each of the days of the week that the customer contacts with the contact center occurred. Time spans may be the increments of time for contact load analysis during the sampled time period. For example, contacts occurring between 8 am and 9 am on all Mondays over the sampled time period may be grouped together, contacts occurring between 9 am and 10 am on all Tuesdays over the sampled time period may be grouped together, and so on. Although in this example the time spans are each one hour long, the time spans may be of any suitable length. For example, the time spans may be half-hour, quarter-hour, and/or minutes long. Furthermore, the time spans may be uniform or non-uniform in length (i.e., the time spans may all be the same length, or at least some time spans may be different lengths).

At block 214, at least a portion of the accumulated numbers may be adjusted based on the determined time zone behaviors for the determined locations of the customers. In some configurations, at least a portion of the accumulated numbers may be shifted by one hour to account for a daylight saving time shift in at least one of the determined locations of the customers.

In some configurations, the method 200 may include deriving representative load information for a future time period based on the accumulated numbers. The method 200 may include adjusting the representative load information for the future time period based on the determined time zone behaviors for the determined locations of the customers. At least a portion of the accumulated numbers may be shifted by one hour to account for a future daylight saving time shift occurring during the future time period in at least one of the determined locations of the customers.

In further configurations, the method 200 may include averaging the accumulated numbers to obtain an average call load for each of the time spans of each of the days of the week that the customer contacts with the contact center occurred.

Figure 4:
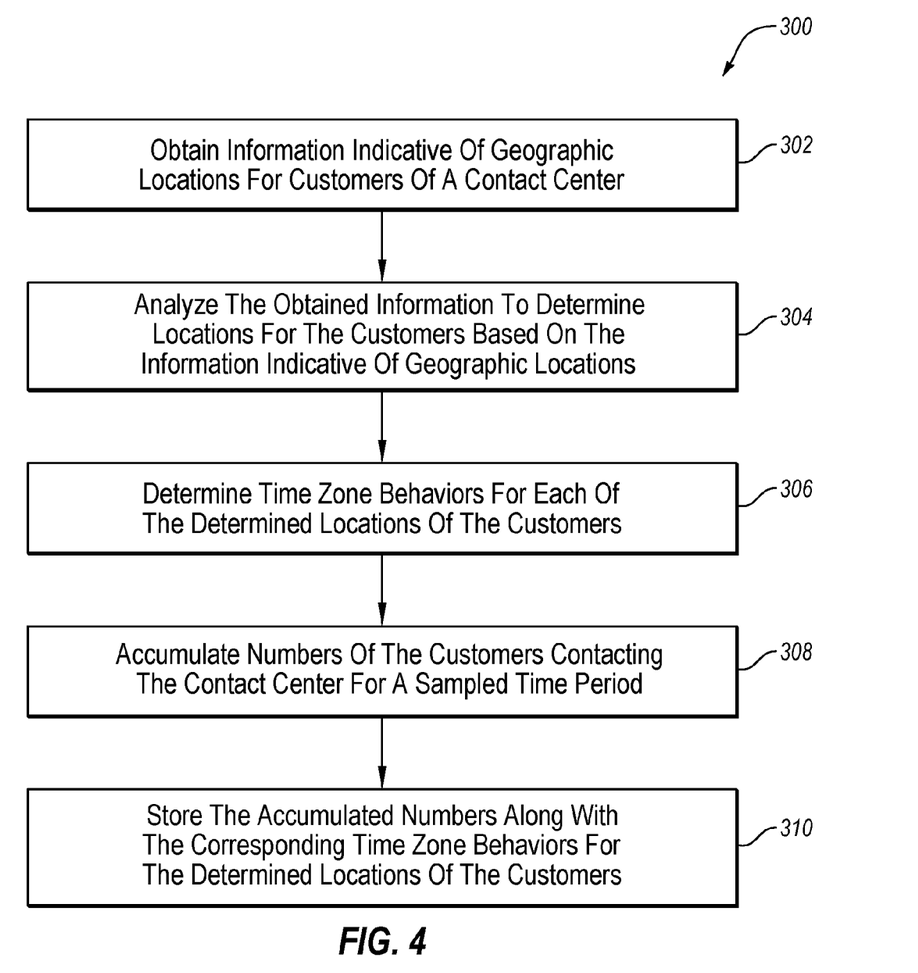
FIG. 4 is a flow diagram of another example method of generating contact totals based on customer behavior in different time zones.

FIG. 4 is a flow diagram of an example method 300 of generating contact totals based on customer behavior in different time zones. In some configurations, the method 300 may be performed by a contact center that generates contact totals based on customer behavior in different time zones. For example, the method 300 may be performed at the contact center 100 of FIG. 2. The method 300 may include any suitable aspects described with respect to the method 200 of FIG. 3, and vice versa. The method 300 may begin at block 302.

At block 302, information indicative of geographic locations for customers of a contact center may be obtained. The information indicative of geographic locations for customers of a contact center may include: address, phone number, GPS location, carrier routing information, IP address, metadata, and/or data associated with the contact media. In some configurations, the information indicative of geographic locations for the customers may include contact media or account information for the customers. The information indicative of geographic locations for customers may be obtained from any suitable sources, for example, from contacts with the customers or from databases including information regarding the customers.

At block 304, the obtained information may be analyzed to determine locations for the customers based on the information indicative of geographic locations. The locations of the customers communicating with the contact center may be determined based on any available information, such as: customer address, customer phone number, customer GPS location, carrier routing information, customer IP address, customer metadata, and/or data associated with the contact media. The determined locations may include information to determine time zone behavior, such as city (which may include additional information to disambiguate, such as state or province and country), vertical and horizontal coordinates, GPS coordinates, Latitude & Longitude, and/or ZIP code. The determined locations may be default locations, approximate locations, exact location and/or a combination thereof.

In some circumstances, other metadata associated with a contact media may provide a basis for customer location approximation, including carrier reconciliation or billing data for the media used for the contact.

In some configurations, Bayesian analysis may be used to identify an approximate or exact location for a customer. In some aspects, Bayesian analysis may include using any or all available approximation techniques, such as those described above, and performing Bayesian statistical analysis to determine the highest-likelihood location for the customer.

In some configurations, the method 300 may include designating a default location for a customer. For example, a default location may be designated for a customer if an exact or approximate location cannot be determined and/or cannot be determined to a sufficient degree of accuracy. The default location may be, for example, the location of a contact center, or the location of an agent or a subset of agents. In other configurations, the method 300 may include omitting a contact if an exact or approximate location cannot be determined for a customer.

At block 306, time zone behaviors for the determined locations of the customers may be determined. The time zone behavior may include the time zone of the customer along with the DST behavior of the determined location for the customer. Determining time zone behaviors may include determining a time zone jurisdiction for the determined locations of the customers. The time zone behavior may be determined at the time that each of the customer contacts occurs. In some configurations, the time zone behavior and/or time zone jurisdiction for a customer location may be determined by computation, transformation and/or referencing a table, a database and/or a web service. The time zone behavior may be determined based on the locations determined for the customers based on the information indicative of geographic locations. The time zone behavior may be determined based on city (which may include additional information to disambiguate, such as state or province and country), vertical and horizontal coordinates, GPS coordinates, Latitude & Longitude, and/or ZIP code of the customers. For example, in the United States, the time zone behavior may be identified based in part on the state in which the customer resides or is currently located in. However, in some circumstances and/or for some locations, a portion of the state (such as a city or county) may adhere to a different time zone than the rest of the state (see for example, FIG. 1). In such circumstances, the time zone behavior may take into account such aspects.

At block 308, numbers of the customers contacting the contact center may be accumulated for a sampled time period. The time zone behavior may include the time zone of the customer along with the DST behavior of the determined location for the customer. The time zone behavior may be determined at the time that each of the customer contacts occurs. In some configurations, the time zone behavior for a customer location may be determined by computation, transformation and/or referencing a table, a database and/or a web service. The time zone behavior may be determined based on the locations determined for the customers based on the information indicative of geographic locations. The time zone behavior may be determined based on city (which may include additional information to disambiguate, such as state or province and country), vertical and horizontal coordinates, GPS coordinates, Latitude & Longitude, and/or ZIP code of the customers. For example, in the United States, the time zone behavior may be identified based on the state that the customer resides in or is currently located in.

At block 310, the accumulated numbers may be stored along with the corresponding time zone behaviors for the determined locations of the customers. In some configurations, the accumulated numbers may represent historical data. The historical data may be selected to represent or predict a future load of a contact center. For example, historical data recorded for a contact center on a previous Wednesday may be used to approximate or predict the load on the contact center for an upcoming Wednesday. In further configurations, historical data may be selected to remove anomalous circumstances, such as holidays. For example, if Christmas Day falls on a Wednesday, the data for that day may be treated as anomalous and not be selected to be used to predict loads on the contact center for an upcoming Wednesday. The historical data may be selected based on schedules and/or rules that are selected and/or implemented by people or data processing systems.

In some configurations, the method 300 may include deriving representative load information for a future time period based on the accumulated numbers in the sampled time period and the corresponding time zone behavior for the determined locations of the customers.

In some aspects, deriving the representative load information may include: grouping the accumulated numbers according to days of the week in a target time period that customer contacts with the contact center occurred; grouping the accumulated numbers based on time spans of the days of week that the customer contacts with the contact center occurred; shifting at least a portion of the accumulated numbers in the target time period based on the corresponding time zone behavior; and averaging the accumulated numbers to obtain an average call load for each of the time spans for each of the days of the week in the target time period. In some configurations, the accumulated numbers in the target time period may be shifted to correspond with a reference time standard of a reference location.

In some configurations, the target time period may be at least a portion of the sampled time period. The target time period may be a date range selected from the historical data for contact load prediction. The target time period may be a subset of time spans from the historical data selected as appropriate, for example, to remove or decrease the prevalence of anomalies.

In some configurations, the method 300 may include selecting a reference location, a reference time standard, and/or a reference time zone behavior. In some aspects, the reference location may be the contact center. The reference time zone behavior may be selected based on: the location of a contact center; the location of a WFM planning team or manager; the location of contact center agents or a subset of contact center agents. In other aspects, the reference time zone behavior may be selected based on the time zone behavior of each customer communicating with the contact center. In some configurations, the method 300 may include shifting the accumulated numbers in the target time period based on the time zone behavior of the reference time standard of the reference location.

In some configurations, the method 300 may include excluding at least a portion of the accumulated numbers from the sampled time period.

In some configurations, the method 300 may include adjusting the representative load information for a future time period based on the determined time zone behaviors for the determined locations of the customers. In some aspects, at least a portion of the accumulated numbers may be shifted by one hour to account for a future daylight saving time shift occurring during the future time period in at least one of the determined locations of the customers.

In some aspects, the method 200 or the method 300 may be performed for customers of more than one contact center. For example, an organization may include multiple contact centers that contact customers. In such configurations, one or more contact centers may manage contacts for the contact centers. In some circumstances, the contact centers may be in different locations with different time zone behaviors. In such aspects, the method 200 or the method 300 may include taking into account the time zone behaviors of the contact center. The method 200 or the method 300 may include taking into account multiple contact centers in accumulating numbers, grouping the accumulated numbers, generating contact totals, deriving representative load information, and/or other aspects of the method 200 or the method 300. The method 200 or method 300 may include adapting agents of the contact centers to handle certain customer contacts based on the determined time zone behaviors. The method 200 or method 300 may include apportioning contact loads based on predicted behavior. For example, call loads during different periods of the day may be handled by agents in time zones adapted to their most-favorable daily schedules. In some aspects, the method 200 or method 300 may include apportioning head count by hour according to best-attendance staffing patterns at the contact centers.

Figure 5A:
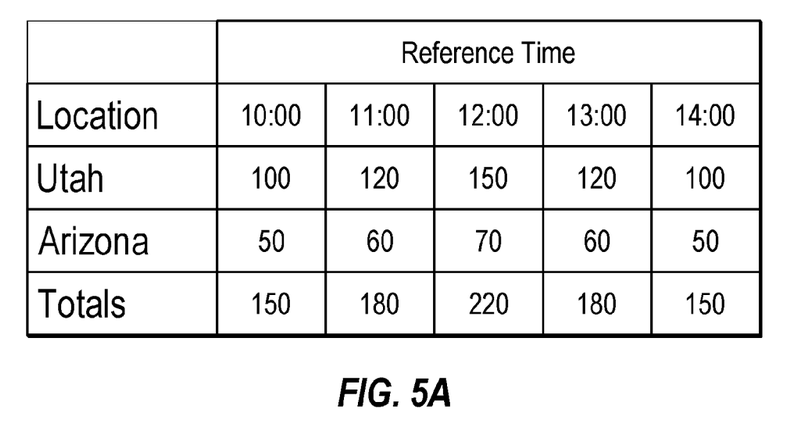
FIG. 5A illustrates an example of accumulated numbers of customers contacting a contact center over a sampled time period.
Figure 5B:
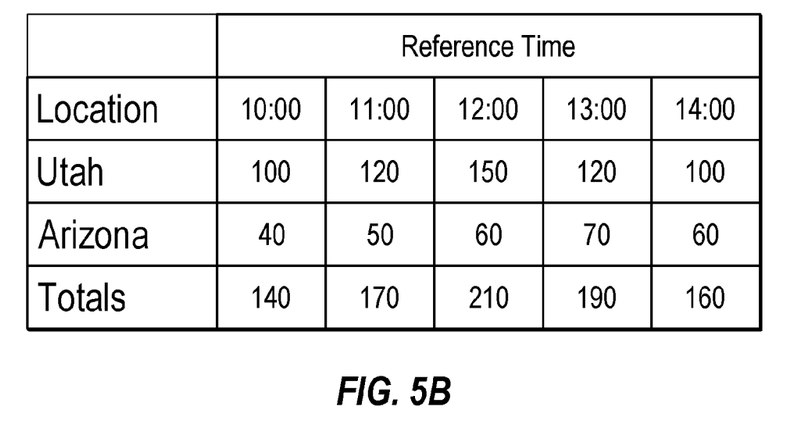
FIG. 5B illustrates the accumulated numbers of FIG. 5A adjusted based on a determined time zone behavior.

FIG. 5A illustrates an example of accumulated numbers of customers contacting a contact center over a sampled time period. FIG. 5B illustrates the accumulated numbers of FIG. 5A adjusted based on a determined time zone behavior. In the examples of FIGS. 5A and 5B, the accumulated numbers represent contacts that occurred on a single day in a month, such as a Wednesday in September. The accumulated numbers are grouped into hour-long time spans and are labeled according to a 24-hour time convention. The accumulated numbers also include labels for determined locations indicative of time zone behaviors. In the illustrated examples, the determined locations are the states of Utah and Arizona, which exhibit different time zone behaviors because Arizona currently does not observe DST, although both Utah and Arizona are located in the same time zone. In FIGS. 5A and 5B, the reference time or reference time zone behavior may be Utah, which may be where the contact center is located.

As illustrated in FIG. 5A, the contact center experiences increased contact loads during certain time spans, as indicated by increased numbers of contacts. For example, both Utah and Arizona exhibited increased contact loads during time span 12:00 that may correspond to lunch time for those locations.

For certain times of the year, Arizona and Utah may exhibit the same time zone behavior, and the accumulated numbers for Arizona may not need to be treated as shifted to correspond to the reference time of Utah, as illustrated for example in FIG. 5A. For other times of the year, the accumulated numbers for Arizona may need to be shifted by one hour (or one time span one hour in length) to correspond to the reference time of Utah, as illustrated, for example, in FIG. 5B.

In another example, the accumulated numbers represented in FIG. 5A may be treated as shifted by one hour (e.g., relative to a reference time) as represented in FIG. 5B to account for a future daylight saving time shift. This may be performed additionally or alternatively to the shifting of historical data described above. In such aspects, the accumulated numbers representing historical data may be used to predict future contact loads that may occur when a daylight saving time shift occurs. Thus, representative load information for a future time period may be adjusted based on the time zone behaviors for the determined locations of the customers, in this example, Utah and Arizona.

In some embodiments, the adjusted representative load information for a future time period may be employed to account for time changes associated with DST. Additionally or alternatively, the adjusted representative load information may be employed to account for changes to DST observation, such as jurisdictions adopting and/or abandoning DST changes or shifts. Additionally or alternatively, the adjusted representative load information may be employed to account for changes such as time zone realignment, changes to time zone jurisdiction boundaries, changes in time zone boundaries, and/or other changes.

The terms and words used in this description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A computerized method of generating contact totals based on customer communication patterns in different time zones to provide to a workforce management system, comprising:

obtaining, by a computing device, information indicative of geographic locations for customer contacts of a contact center, wherein the information is based on a type of metadata that is received by the computing device, and wherein the type of metadata is based on a type of customer device each respective customer uses to contact the call center;

analyzing, by the computing device, the obtained information to determine locations for customers associated with the contacts based on the information indicative of geographic locations;

determining, by the computing device, time zone behaviors for the determined locations of the customers;

accumulating, by the computing device, numbers of the customers contacting the contact center over a sampled time period;

grouping, by the computing device, the accumulated numbers based on time spans of days that the customer contacts with the contact center occurred;

generating, by the computing device, contact totals based on the accumulated numbers, including adjusting at least a portion of the accumulated numbers based on the determined time zone behaviors for the determined locations of the customers, wherein at least a portion of the accumulated numbers are shifted by one hour to account for a daylight saving time shift in at least one of the determined locations of the customers; and transmitting, by the computing device, the contact totals to the workforce management system.

2. The computerized method of claim 1, wherein determining the contact totals further comprises:

deriving representative load information for a future time period based on the accumulated numbers; and adjusting the representative load information for the future time period based on the determined time zone behaviors for the determined locations of the customers, wherein at least a portion of the accumulated numbers are shifted by one hour to account for a future daylight saving time shift occurring during the future time period in at least one of the determined locations of the customers.

3. The computerized method of claim 1, further comprising:

grouping the accumulated numbers based on days of the week that the customer contacts with the contact center occurred; and averaging the accumulated numbers to obtain an average call load for each of the time spans of each of the days of the week that the customer contacts with the contact center occurred.

4. The computerized method of claim 2, wherein the deriving of representative load information comprises:

grouping the accumulated numbers according to days of the week in a target time period that customer contacts with the contact center occurred, wherein the target time period is at least a portion of the sampled time period;

grouping the accumulated numbers based on time spans of the days of the week that the customer contacts with the contact center occurred;

shifting at least a portion of the accumulated numbers in the target time period based on the corresponding time zone behavior; and averaging the accumulated numbers to obtain an average call load for each of the time spans for each of the days of the week in the target time period.

5. The computerized method of claim 4, wherein the accumulated numbers in the target time period are shifted to correspond with a reference time standard of a reference location.

6. The computerized method of claim 5, wherein the reference location is the contact center.

7. The computerized method of claim 4, further comprising shifting the accumulated numbers in the target time period based on the time zone behavior of a reference time standard of a reference location.

8. The computerized method of claim 1, wherein at least one of the determined locations is a default location, an approximate location, or an exact location for one of the customers.

9. The computerized method of claim 1, wherein the information indicative of geographic locations for the customers includes contact media or account information for the customers.

10. The computerized method of claim 1, further comprising excluding at least a portion of the accumulated numbers from the sampled time period.

* * * * *